United States Patent
Wagner et al.

(10) Patent No.: US 12,281,600 B2
(45) Date of Patent: Apr. 22, 2025

(54) SYSTEM AND METHOD FOR GAS TURBINE INTEGRATED HYDROGEN PRODUCTION WITH ZERO CARBON DIOXIDE EMISSIONS

(71) Applicant: MITSUBISHI HEAVY INDUSTRIES, LTD., Tokyo (JP)

(72) Inventors: Mark J. Wagner, Houston, TX (US); Shunsuke Torii, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 18/371,539

(22) Filed: Sep. 22, 2023

(65) Prior Publication Data

US 2025/0101888 A1    Mar. 27, 2025

(51) Int. Cl.
*F01K 25/00* (2006.01)
*F01K 23/06* (2006.01)
*F02C 3/22* (2006.01)

(52) U.S. Cl.
CPC .......... *F01K 25/005* (2013.01); *F01K 23/067* (2013.01); *F02C 3/22* (2013.01); *Y02E 20/18* (2013.01); *Y02E 60/30* (2013.01)

(58) Field of Classification Search
CPC .............................. F01K 25/005; Y02E 60/30
See application file for complete search history.

(56) References Cited

U.S. PATENT DOCUMENTS

| | | | | |
|---|---|---|---|---|
| 8,869,502 B2 * | 10/2014 | Kim | ...................... | F22B 37/248 60/39.12 |
| 2012/0204573 A1 * | 8/2012 | Draper | ...................... | F02C 3/20 60/39.12 |
| 2022/0315424 A1 | 10/2022 | Ashton et al. | | |

FOREIGN PATENT DOCUMENTS

| | | |
|---|---|---|
| JP | 11-336562 | 12/1999 |
| JP | 2003-49610 | 2/2003 |

OTHER PUBLICATIONS

International Search Report mailed Sep. 10, 2024 in International (PCT) Application No. PCT/JP2024/080094.
Written Opinion of the International Searching Authority mailed Sep. 10, 2024 in International (PCT) Application No. PCT/JP2024/080094.

* cited by examiner

*Primary Examiner* — Katheryn A Malatek
(74) *Attorney, Agent, or Firm* — Wenderoth, Lind & Ponack, L.L.P.

(57) ABSTRACT

A system includes a hydrogen gas production system and a power generation system. The hydrogen gas production system includes a heated gas supply line configured for flow of a heated gas, a hydrocarbon supply line, a catalytic pyrolysis reactor configured to be in thermal contact with the heated gas of the heated gas supply line and produce a hydrogen containing gas by pyrolyzing a hydrocarbon introduced therein via the hydrocarbon supply line, and a separator configured to extract a hydrogen gas from the hydrogen containing gas discharged from the catalytic pyrolysis reactor. The power generation system includes a heated gas collection line configured to collect the heated gas after the thermal contact with the catalytic pyrolysis reactor and supply the heated gas to the power generation system, and a gas turbine having a combustor configured to burn the hydrogen gas introduced therein from the separator via a hydrogen supply line.

20 Claims, 9 Drawing Sheets

SYSTEM AND METHOD FOR GAS TURBINE INTEGRATED HYDROGEN PRODUCTION WITH ZERO CARBON DIOXIDE EMISSIONS

BACKGROUND

1. FIELD

The present disclosure relates to a system and a method for gas turbine integrated hydrogen production with zero carbon dioxide ($CO_2$) emissions.

2. RELATED ART

Various processes exist for hydrogen generation including catalytic pyrolysis, steam methane reforming (SMR), and autothermal pyrolysis. Both SMR and autothermal pyrolysis processes require oxygen and produce $CO_2$ as an off-gas. While $CO_2$ can be captured and stored, only catalytic methods produce carbon and hydrogen without the need to capture off-gases. However, available systems and methods emit waste heat and greenhouse gases, and are not coupled with a gas turbine for improved efficiency, therefore there is a need for such systems and methods.

SUMMARY

Technical Problem

Waste heat, from hydrogen production using methane pyrolysis, is lost to the environment. Greenhouse gases absorb and trap heat in the atmosphere, and $CO_2$ is a principal example of a greenhouse gas. Consequently, the emission of $CO_2$ during hydrogen production both squanders energy that could be used for power generation and also contributes to air pollution.

In view of the above, an object of at least one embodiment of the present disclosure is to integrate hydrogen production with a gas turbine (for example, in a combined cycle power plant) to recover waste heat with zero $CO_2$ emissions. The waste heat is sent to a gas turbine system (for example, a gas turbine combined cycle (GTCC) system) to improve the overall efficiency of power generation and hydrogen production.

Solution to Problem

A system and a method according to the present disclosure provide a process for zero $CO_2$ emission hydrogen production using a hydrocarbon in a catalytic pyrolysis reactor coupled with a hydrogen fueled combined cycle gas turbine. Overall process thermal efficiency benefits are realized by directing thermal energy from the gas turbine to the catalytic pyrolysis reactor and/or capturing catalytic pyrolysis reactor heat and returning the catalytic pyrolysis reactor heat to the gas turbine to enhance electric power generation. Integrating gas turbine compressor exit gas or turbine expansion gas, heated as part of the power generation cycle, into the pyrolysis process reduces the amount of incremental energy required to heat the hydrocarbon in the catalytic pyrolysis reactor. Waste heat generated in providing the pyrolysis activation energy for hydrogen production can then be captured and returned to the gas turbine so as to improve the power generation efficiency of the overall process.

In order to achieve the above-noted object, a system according to the present disclosure comprises: a hydrogen gas production system; and a power generation system, wherein the hydrogen gas production system includes: a heated gas supply line configured to allow a heated gas to flow therethrough; a hydrocarbon supply line; a catalytic pyrolysis reactor configured to: (i) produce a hydrogen containing gas by pyrolyzing a hydrocarbon introduced therein via the hydrocarbon supply line; and (ii) be in thermal contact with the heated gas of the heated gas supply line; and a separator configured to extract a hydrogen gas from the hydrogen containing gas discharged from the catalytic pyrolysis reactor, and wherein the power generation system includes: a heated gas collection line configured to: (i) collect the heated gas after the thermal contact with the catalytic pyrolysis reactor; and (ii) supply the heated gas to the power generation system; and a gas turbine having a combustor configured to burn the hydrogen gas introduced therein from the separator via a hydrogen supply line.

In order to achieve the above-noted object, a method according to the present disclosure comprises: producing, by a catalytic pyrolysis reactor, a hydrogen containing gas by pyrolyzing a hydrocarbon introduced into the catalytic pyrolysis reactor via a hydrocarbon supply line; and extracting, by a separator, a hydrogen gas from the hydrogen containing gas discharged from the catalytic pyrolysis reactor; collecting, by a heated gas collection line, a heated gas after thermal contact with the catalytic pyrolysis reactor; supplying, by the heated gas collection line, the heated gas to a power generation system; and burning, by a combustor of a gas turbine, the hydrogen gas introduced therein from the separator via a hydrogen supply line.

Advantageous Effects

According to a system and a method of the present disclosure, it is possible to produce hydrogen using gas turbine-integrated catalytic pyrolysis of a hydrocarbon with zero CO2 emissions.

BRIEF DESCRIPTION OF DRAWINGS

A detailed description will be provided below with reference to the drawings, in which.

DETAILED DESCRIPTION

Exemplary embodiments will be described in detail below with reference to the drawings. The description and drawings are provided so that a person skilled in the art can fully understand the present disclosure and are not intended to limit the subject matter recited in the claims.

The present disclosure entails catalytic pyrolysis of a hydrocarbon, for example, methane. Methane pyrolysis uses heat in the presence of a catalyst to split elemental methane into hydrogen and carbon. The heat must be applied in the absence of oxygen to avoid production of $CO_2$ or water ($H_2O$). This reaction is endothermic and occurs at or above 1000° C. Since the reaction is endothermic, heat must be added as more reactant is supplied to keep the process going. As a result, waste heat is released at a very high temperature. The baseline hydrogen production process releases the waste heat into the turbine exhaust stream before entry into a heat recovery steam generator (HRSG). In the HRSG, the waste heat is converted to power at about 40% efficiency. If the waste heat is recovered and introduced to the gas turbine or gas turbine system before entering the HRSG, the efficiency of power conversion from the waste heat could be increased to nearly 60%. Exemplary embodiments of how to capture the waste heat within the gas turbine are disclosed below.

Figure 1:
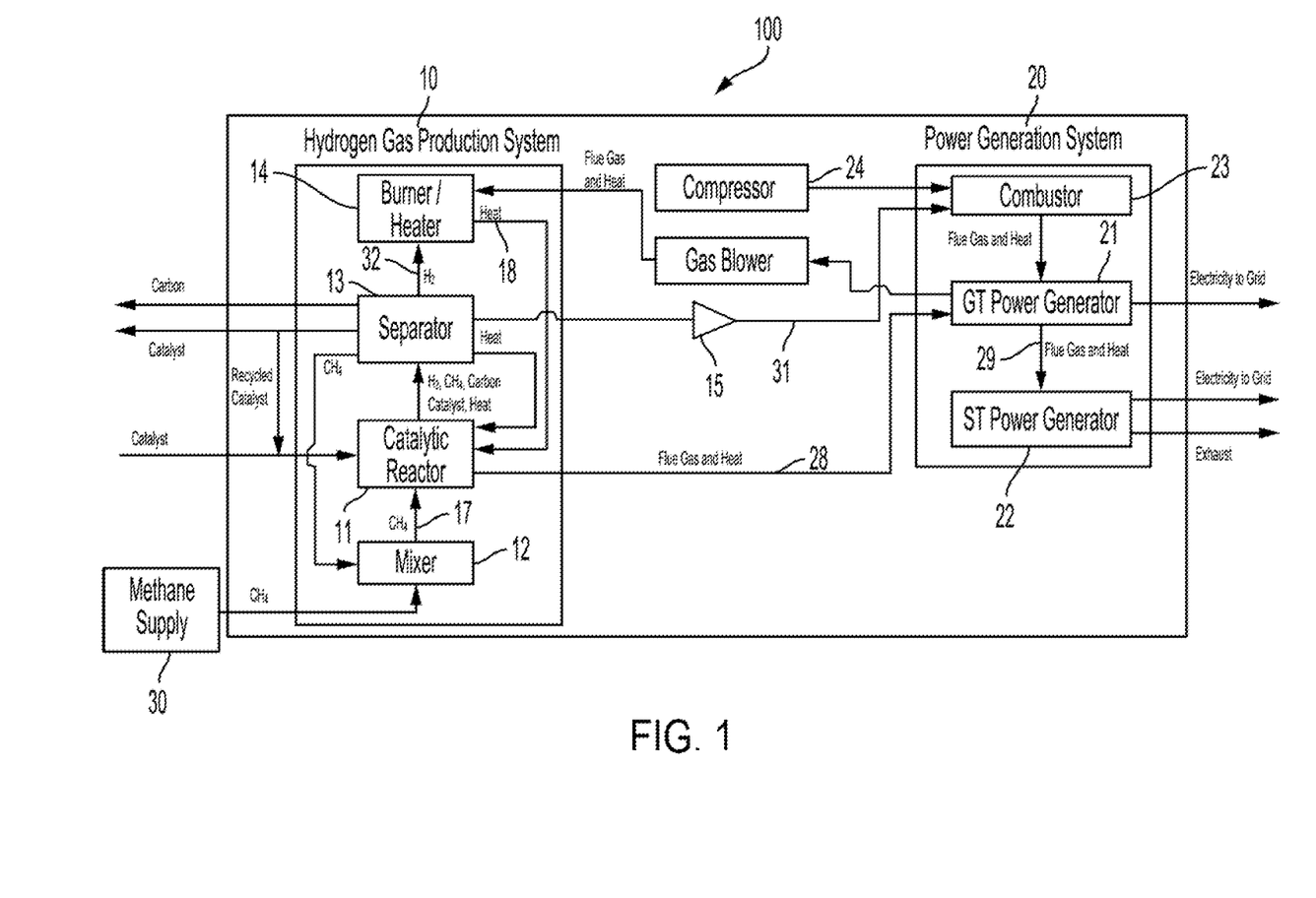
FIG. 1 is a block diagram showing a general configuration of a system according to an embodiment of the present disclosure.

FIG. 1 is a block diagram showing the fluid flow, the heat flow, and the substance flow according to an embodiment of the present disclosure.

As shown in FIG. 1, a system 100 according to an embodiment of the present disclosure includes a hydrogen gas production system 10 and a power generation system 20.

The hydrogen gas production system 10 includes a catalytic pyrolysis reactor 11. Methane is supplied from a methane supply 30 to the catalytic pyrolysis reactor 11 via a hydrocarbon supply line 17. The methane supply 30 may be outside both the hydrogen gas production system 10 and the power generation system 20. The hydrogen gas production system 10 further includes, for example, a methane mixer 12 to recycle unreacted methane, a separator 13 for separating carbon, methane and hydrogen, a burner 14 for supplying heat to the catalytic pyrolysis reactor 11, and a pump 15. A catalyst is provided to the catalytic pyrolysis reactor 11 and may include a recycled catalyst returned from the separator 13. In some variations, the hydrogen gas production system 10 may include a first heat exchanger 16 (as shown in FIGS. 2-9). The hydrocarbon supply line 17 may extend between the first heat exchanger 16 and the catalytic pyrolysis reactor 11. Furthermore, in some variations, the burner 14 may be omitted (as shown in FIGS. 3 & 7).

Figure 7:
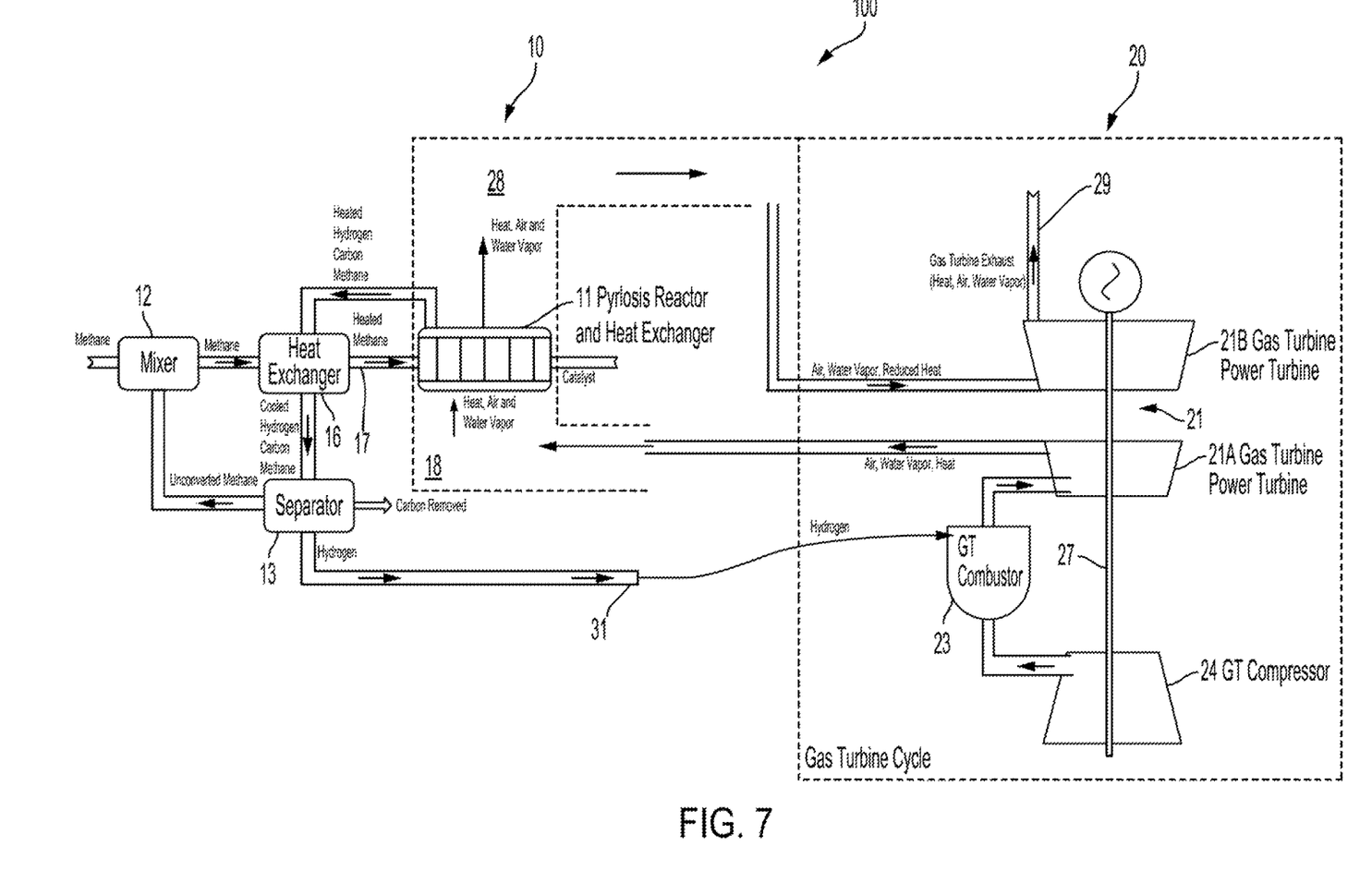
FIG. 7 is a configuration diagram of the system according to an embodiment of the present disclosure.
Figure 8:
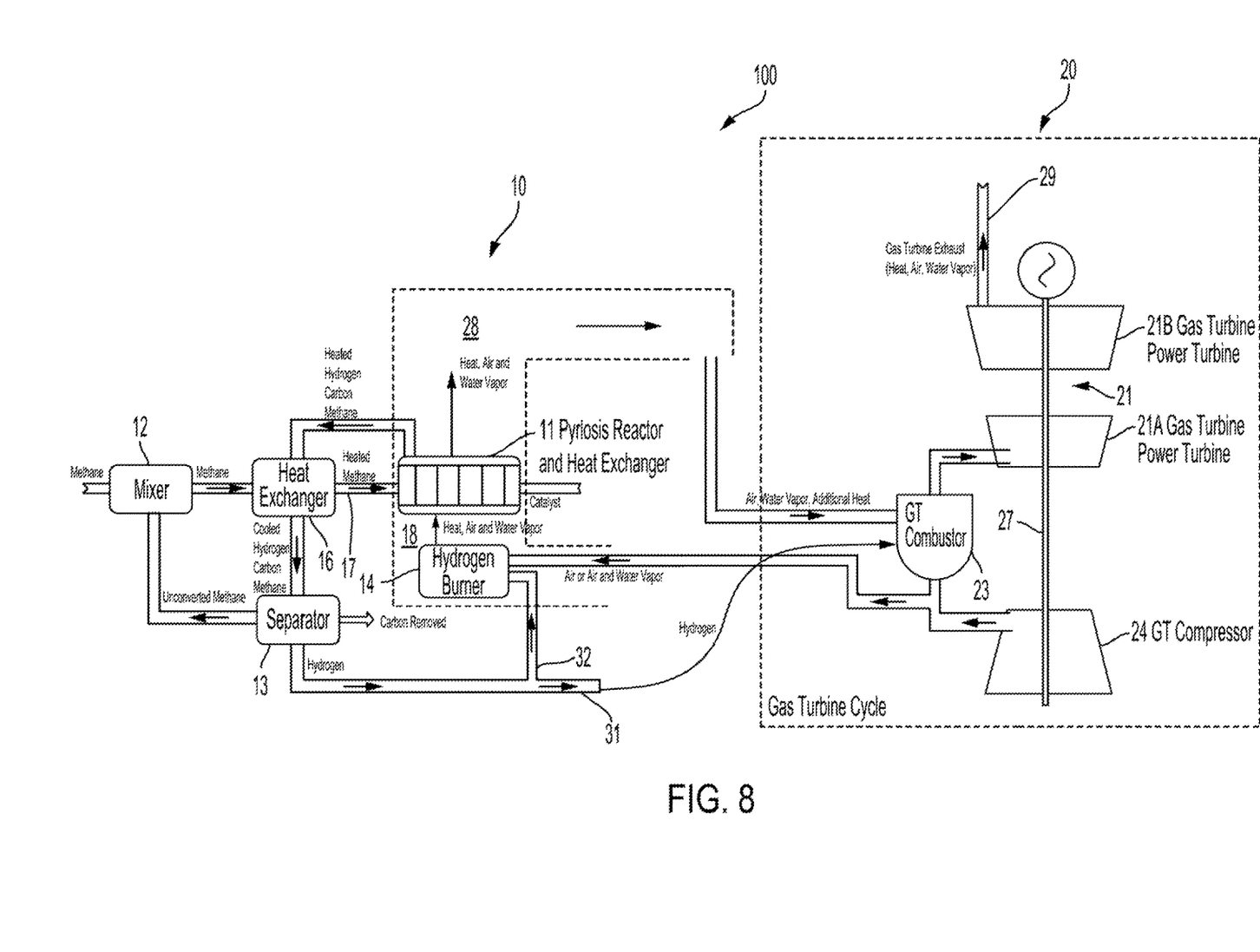
FIG. 8 is a configuration diagram of the system according to an embodiment of the present disclosure.
Figure 9:
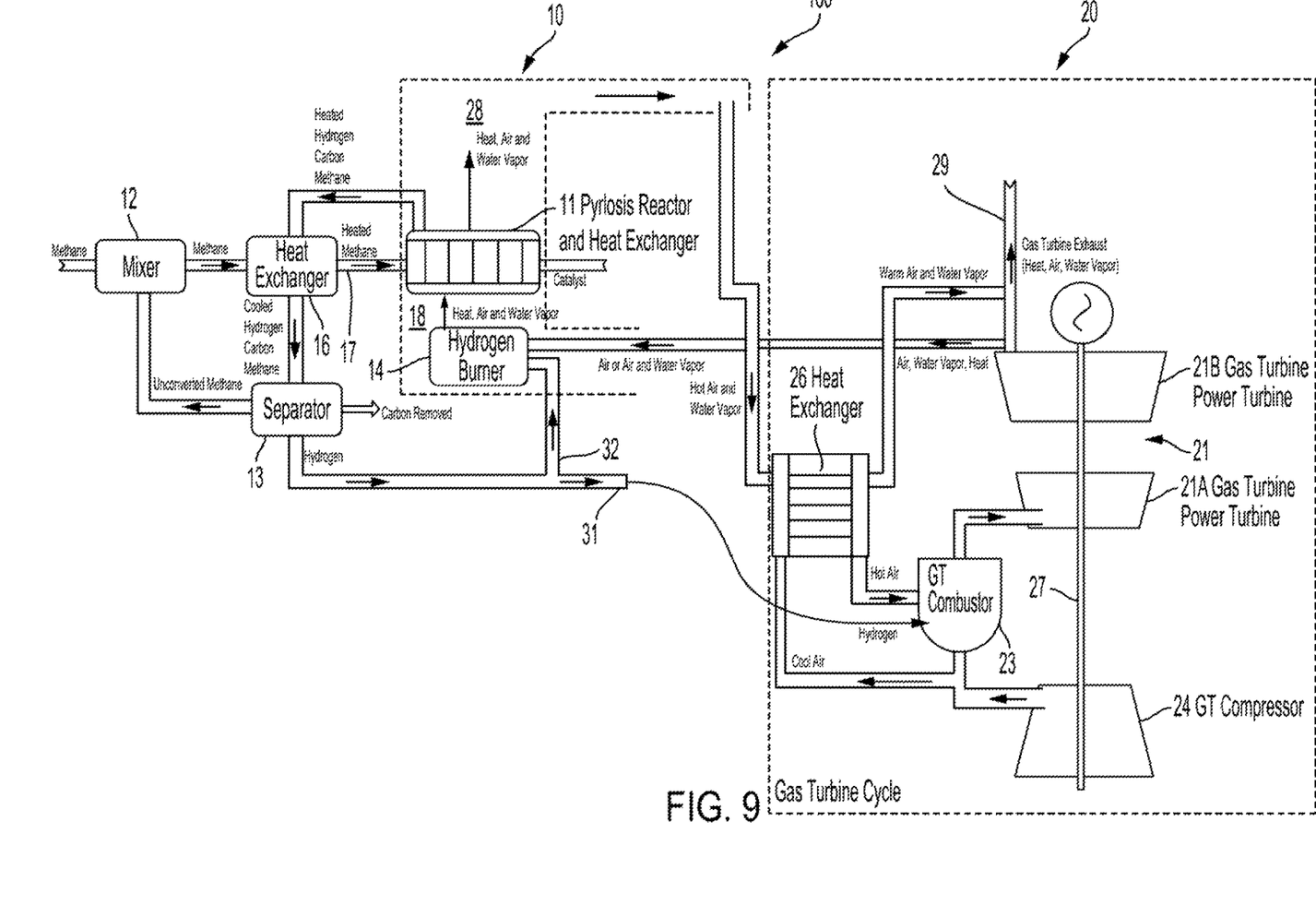
FIG. 9 is a configuration diagram of the system according to an embodiment of the present disclosure.

The power generation system 20 (for example, a GTCC) may include a gas turbine 21, a steam turbine 22, a combustor 23, and a compressor 24. In some variations, the power generation system 20 may include an HRSG 25 (as shown in FIGS. 2-6) and/or a second heat exchanger 26 (as shown in FIGS. 5 & 9). In other variations, the steam turbine 22 and the HRSG 25 may be omitted (as shown in FIGS. 7-9).

Heat, gases (such as air or water vapor) and/or fluids (such as water) are to be exchanged between various elements of the hydrogen gas production system 10 and the power generation system 20 with countermeasures taken to minimize heat and pressure loss levels. For example, hydrogen gas produced by the hydrogen gas production system 10 can be sent to the combustor 23 of the power generation system 20 via a first hydrogen supply line 31 whereby the pump 15 is on the first hydrogen supply line 31 and is configured to increase a pressure of the hydrogen gas to above 250 psig, for example. A heated gas collection line 28 is configured to collect a heated gas after thermal contact with the catalytic pyrolysis reactor 11 and supply the heated gas to the power generation system 20. A heated gas supply line 18 is configured to allow the heated gas to flow therethrough, and the catalytic pyrolysis reactor 11 is configured to be in thermal contact with the heated gas of the heated gas supply line 18. The heated gas supply line 18 may extend between the burner 14 and the catalytic pyrolysis reactor 11. Furthermore, a part of compressed air flowing towards the combustor 23 of the power generation system 20 can be extracted and sent to the burner 14 of the hydrogen gas production system 10 to produce heated gas. Hydrogen from the separator 13 may be sent to the burner 14 via a second hydrogen supply line 32. Gas turbine exhaust from the gas turbine 21 may be sent, via a discharged gas supply line 29, to the HRSG 25.

The gas turbine 21 and the steam turbine 22 may produce electricity to be sent to an electrical grid. Moreover, the steam turbine 22 may produce $CO_2$ free exhaust as a byproduct.

Figure 2:
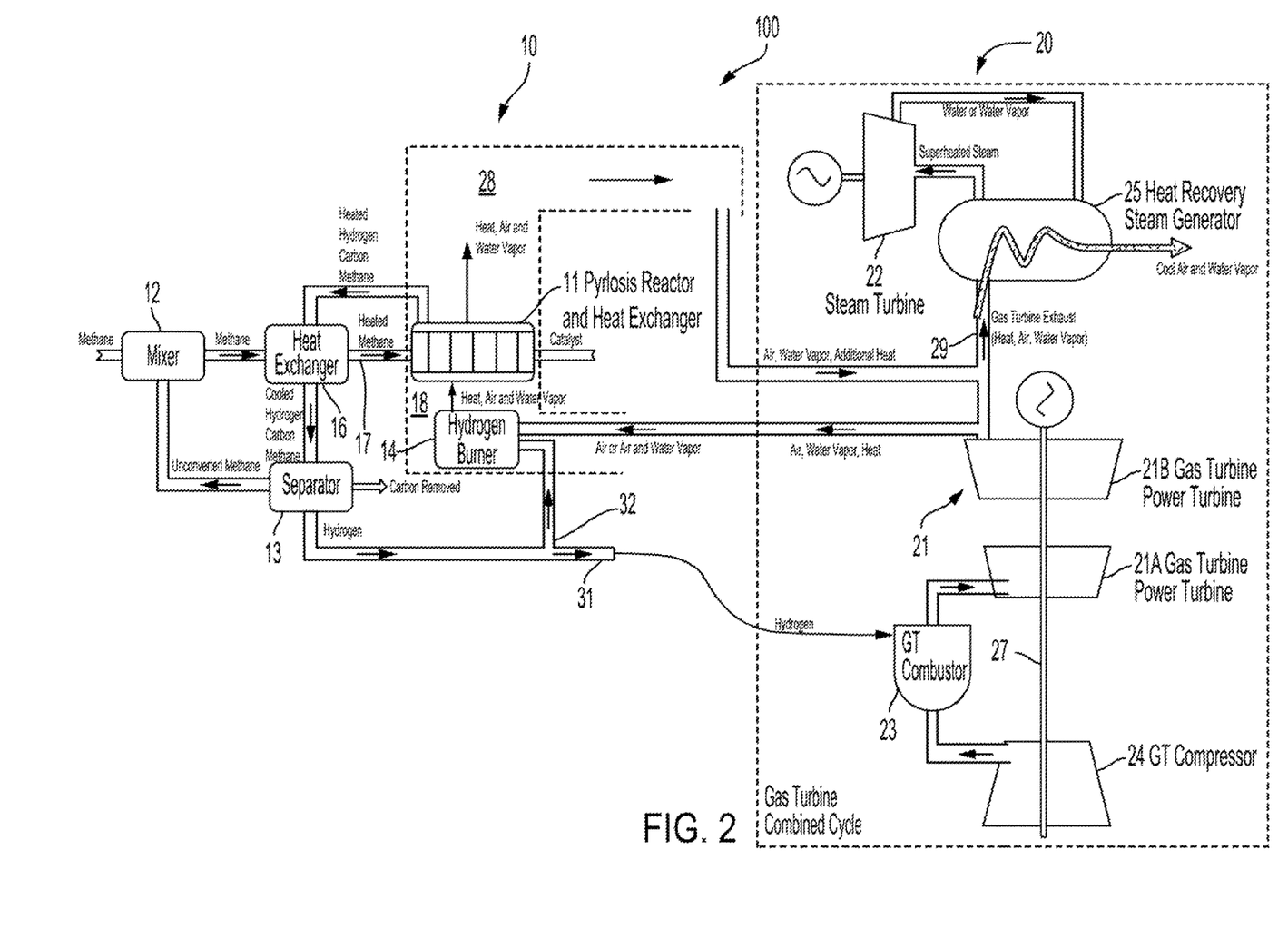
FIG. 2 is a configuration diagram of the system according to an embodiment of the present disclosure.
Figure 3:
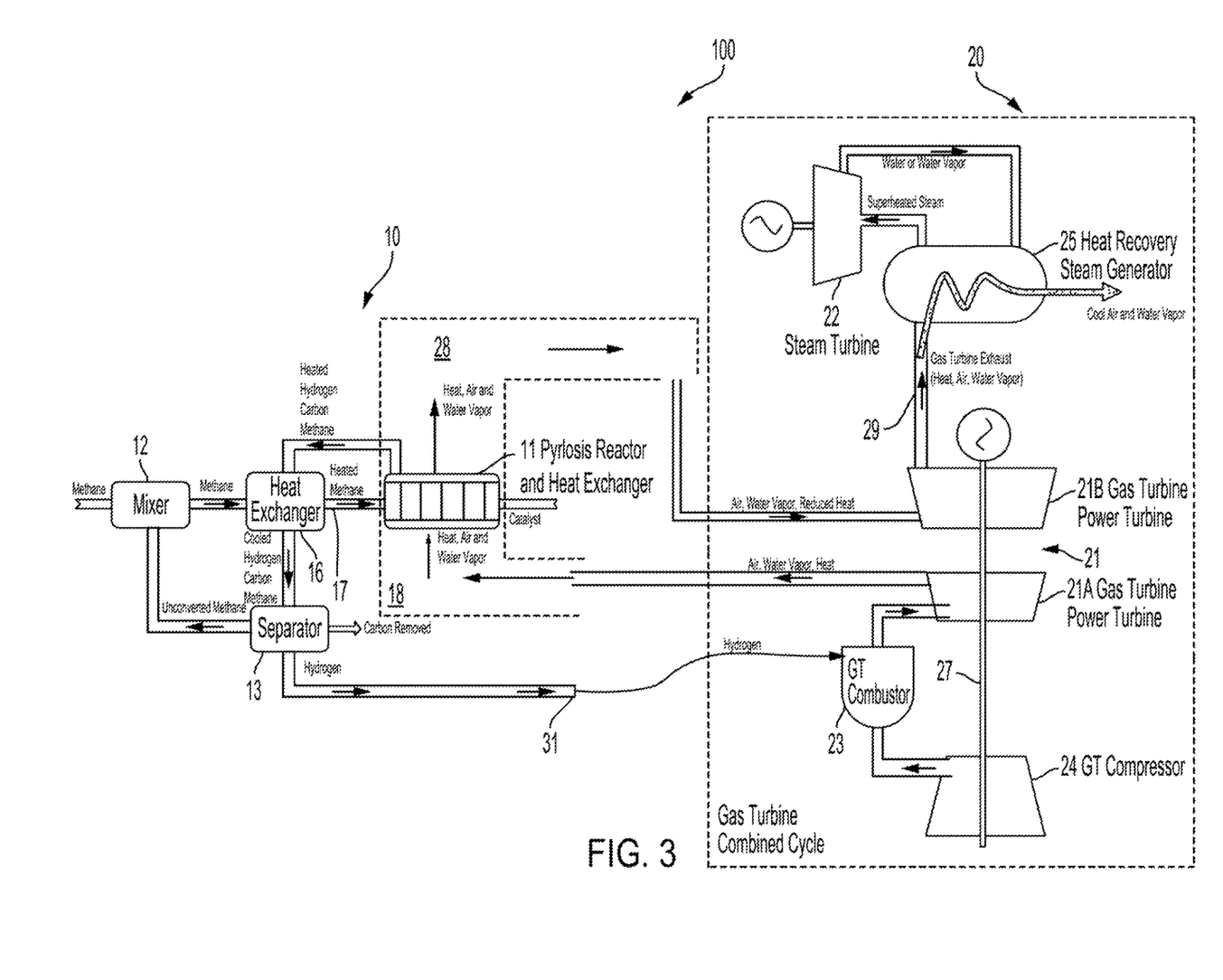
FIG. 3 is a configuration diagram of the system according to an embodiment of the present disclosure.

FIG. 2 is a configuration diagram of an embodiment of a system 100 for a baseline hydrogen production process.

As shown in FIG. 2, a power generation system 20 (for example, a GTCC) according to an embodiment of the present disclosure includes a gas turbine 21 that includes a turbine section including a plurality of turbine stages including a first turbine stage 21A and a second turbine stage 21B downstream of the first turbine stage 21A. In some variations, the turbine section includes three or more turbine stages, for example. In these variations, one of the plurality of turbine stages is the first turbine stage 21A, and the turbine stage subsequently downstream of the first turbine stage 21A is the second turbine stage 21B. Accordingly, the first turbine stage 21A is not limited to the turbine stage in the front row with respect to the gas flow direction. The power generation system 20 further includes the combustor 23 for burning fuel to generate a combustion gas, and the compressor 24 for supplying compressed air (serving as combustion air) to the combustor 23. The first turbine stage 21A and the second turbine stage 21B may share a common rotational shaft 27 with the compressor 24 and are configured to be driven by the combustion gas generated by the combustor 23. In other variations, the first turbine stage 21A and the second turbine stage 21B may not share a common rotational shaft 27, as explained below with respect to FIG. 6.

Methane enters the hydrogen production system 10 and is mixed, in the mixer 12, with any methane which is not converted in the initial pass through the catalytic pyrolysis reactor 11. The methane is heated in a heat exchanger 16 by the heated products of pyrolysis leaving the catalytic pyrolysis reactor 11. A portion of hydrogen supplied by the reactor process is sent from the separator 13 via the second hydrogen supply line 32 and mixed with a portion of heated gas turbine exhaust (with reduced oxygen content) and burned in a hydrogen burner 14 for the catalytic pyrolysis reactor 11, thereby supplying heat to the catalytic pyrolysis reactor 11. The hydrogen burner 14 supplies heat (and/or air and/or water vapor) only and the products of combustion do not mix with the methane in the catalytic pyrolysis reactor 11. A catalyst such as iron, nickel, or carbon is mixed with the methane in the catalytic pyrolysis reactor 11 and reduces the temperature at which the reaction proceeds, wherein methane is broken down or dissociated into hydrogen gas and elemental or solid carbon in the separator 13. For example, this reaction can be performed in the catalytic pyrolysis reactor 11 using a conveyor or a cyclone. This endothermic reaction extracts energy from the products of combustion and reduces the temperature, but the exit temperature of the heated gas provided by the hydrogen burner 14 is now significantly increased compared to the gas turbine exit gas. As an example, the heated gas may be between 600° C. and 1200° C. The hydrogen burner exit gas is returned to the remaining gas turbine exhaust and mixes with the remaining gas turbine exhaust before entering, via the discharged gas supply line 29, the HRSG 25 where pressurized steam is produced to drive a steam turbine 22 and generate electric power. All energy (including pyrolysis waste heat) is returned to the power generation system 20 but the same heat is converted to power at approximately 40% efficiency.

FIG. 3 is a configuration diagram of an embodiment of a system 100 in which partially expanded gas turbine exit gas is directed at a predetermined temperature from the exit of a turbine stage 21A (also referred to as interstage extraction) to the catalytic pyrolysis reactor 11. A dashed line on the left of FIG. 3 shows the airstream envelope. In this embodiment, there is no hydrogen burner for the catalytic pyrolysis reactor 11. All heat is provided by the turbine interstage air. As the turbine air flows through the catalytic pyrolysis reactor 11, the endothermic reaction of methane pyrolysis extracts heat from the turbine air and cools the air. The air, which may now be 300° C. lower in temperature but remains pressurized, is returned to the subsequent turbine expansion stage 21B to continue expansion until exiting the gas turbine 21. Accordingly, all waste heat is captured within the gas turbine 21 control volume for power conversion at improved overall efficiency. For example, the system 100 according to this embodiment may produce 1% more power than the system 100 performing the baseline hydrogen production process as shown in FIG. 2. In some variations, the steam turbine 22 and the HRSG 25 may be omitted, as explained below with respect to FIG. 7.

Figure 4:
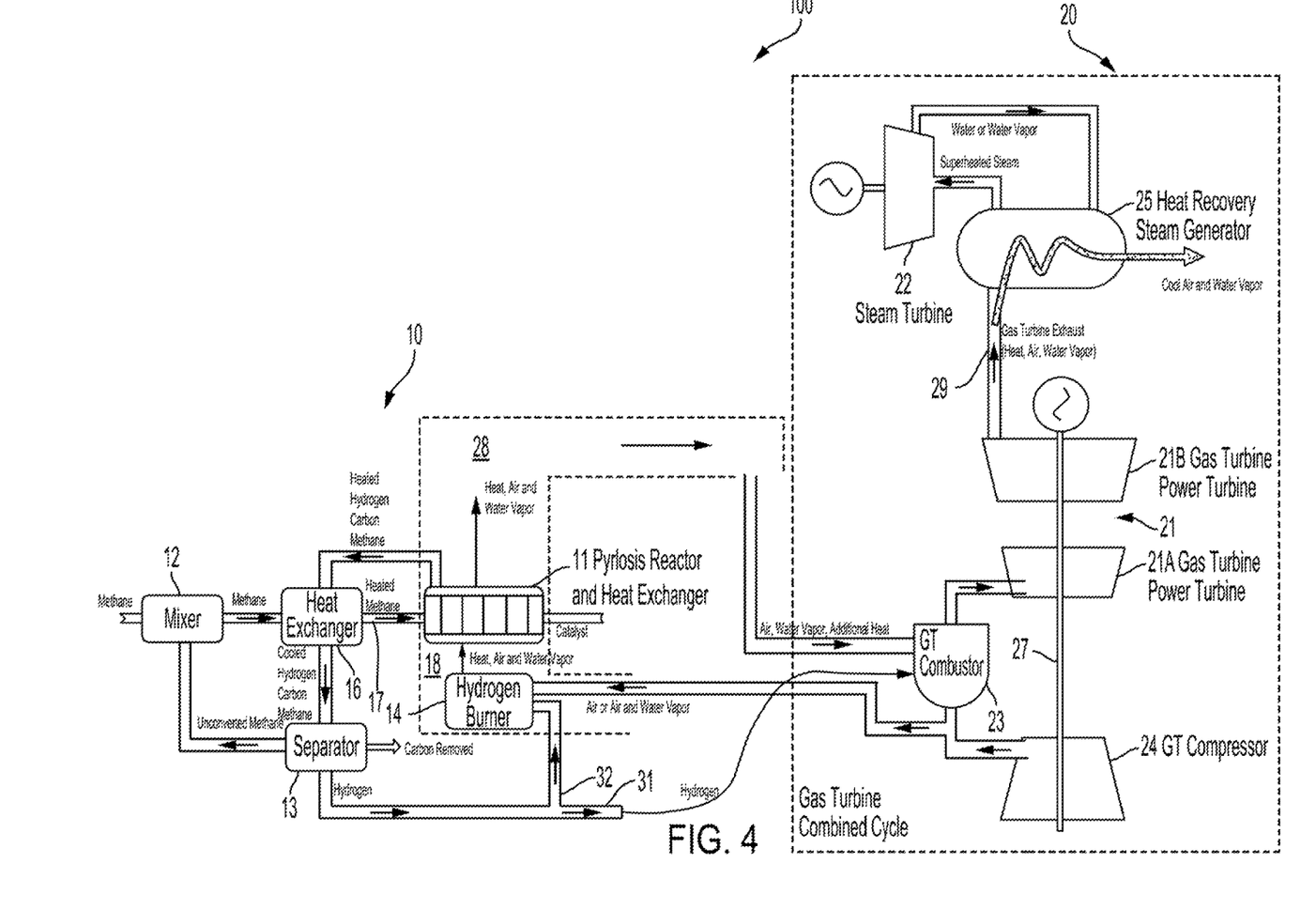
FIG. 4 is a configuration diagram of the system according to an embodiment of the present disclosure.
Figure 5:
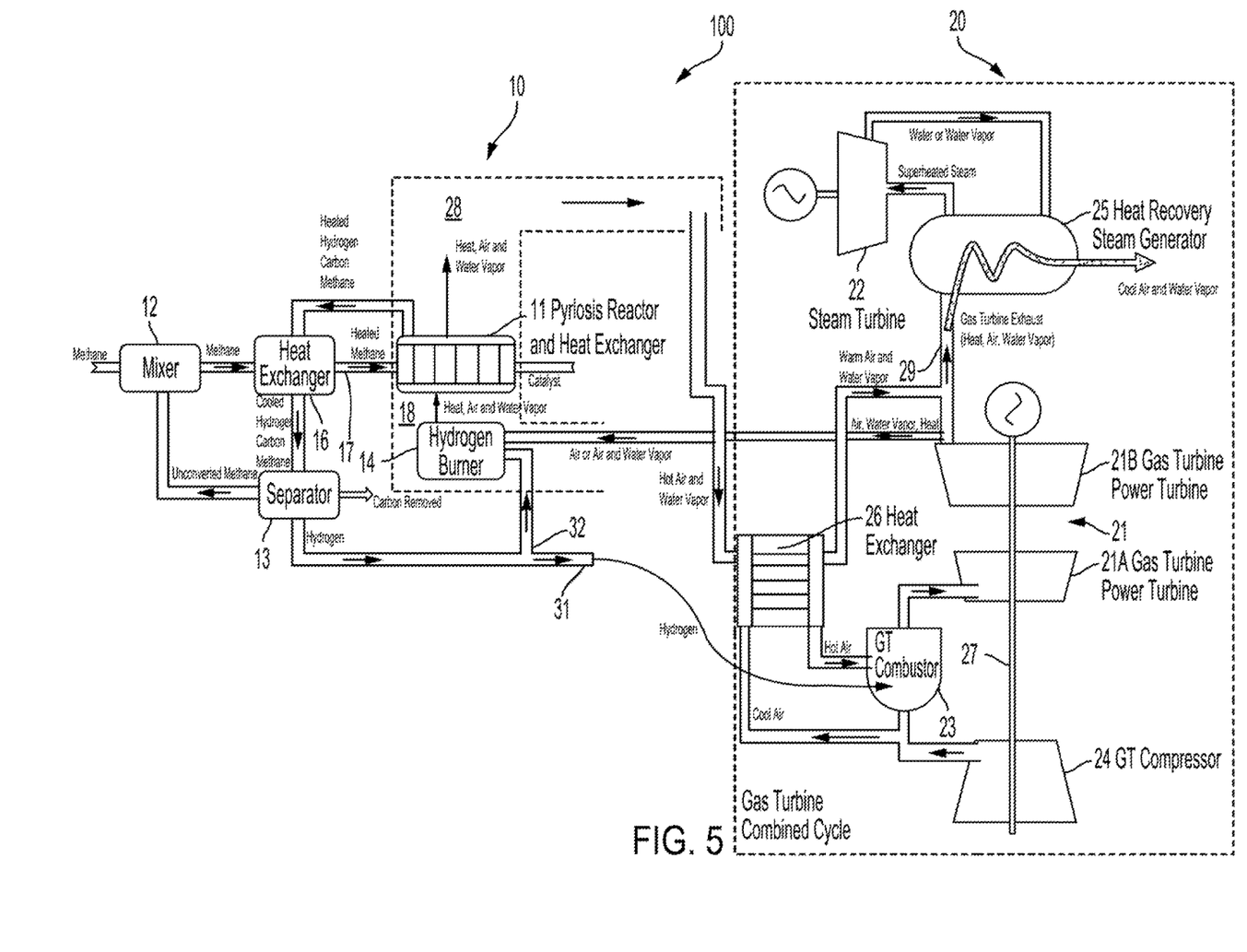
FIG. 5 is a configuration diagram of the system according to an embodiment of the present disclosure.

FIG. 4 is a configuration diagram of an embodiment of a system 100 in which a portion of compressor exit air, which is partially heated due to the work of compression, is directed to the hydrogen burner 14 for the catalytic pyrolysis reactor 11. The air is mixed with hydrogen and combusted to supply heat to the pyrolysis reaction. All energy is captured within the gas turbine 21 control volume and pyrolysis waste heat is returned to the combustor 23, mixed with a portion of remaining compressor exit air and a final portion of hydrogen which is burned to provide power to drive the gas turbine 21 and power generation system 20. For example, the system 100 according to this embodiment may produce 3% more power than a system 100 performing the baseline hydrogen production process as shown in FIG. 2. In some variations, the steam turbine 22 and the HRSG 25 may be omitted, as explained below with respect to FIG. 8.

FIG. 5 is a configuration diagram of an embodiment of a system 100 in which hydrogen is mixed with a portion of gas turbine exit gas flow and burned in the hydrogen burner 14 to provide heat for the catalytic pyrolysis reactor 11. In this embodiment, the reactor exit waste heat is directed to a heat exchanger 26. A first portion of compressor exit air is directed to the same heat exchanger 26 and the two elements exchange heat in a counterflow arrangement to maximize heating of the compressor exit air. Consequently, more than ~70% of waste heat energy is transferred to the portion of compressor air. The heated compressor air is then returned to the combustor 23 and mixed with the remaining portion of compressor exit air. Hydrogen is mixed with the mixed compressor exit air which is burned to provide power to drive the gas turbine 21 and power generation system 20. The cooler reactor burner air is returned to the gas turbine exit and mixed with the remaining portion of gas turbine exit air and sent to the HRSG 25. Accordingly, a larger fraction of the pyrolysis waste heat can be converted to power at a higher efficiency and achieve an overall efficiency greater than the baseline hydrogen production process shown in FIG. 2. For example, the system 100 according to this embodiment may produce 4% more power than the system 100 performing the baseline hydrogen production process shown in FIG. 2. In some variations, the steam turbine 22 and the HRSG 25 may be omitted, as explained below with respect to FIG. 9.

Figure 6:
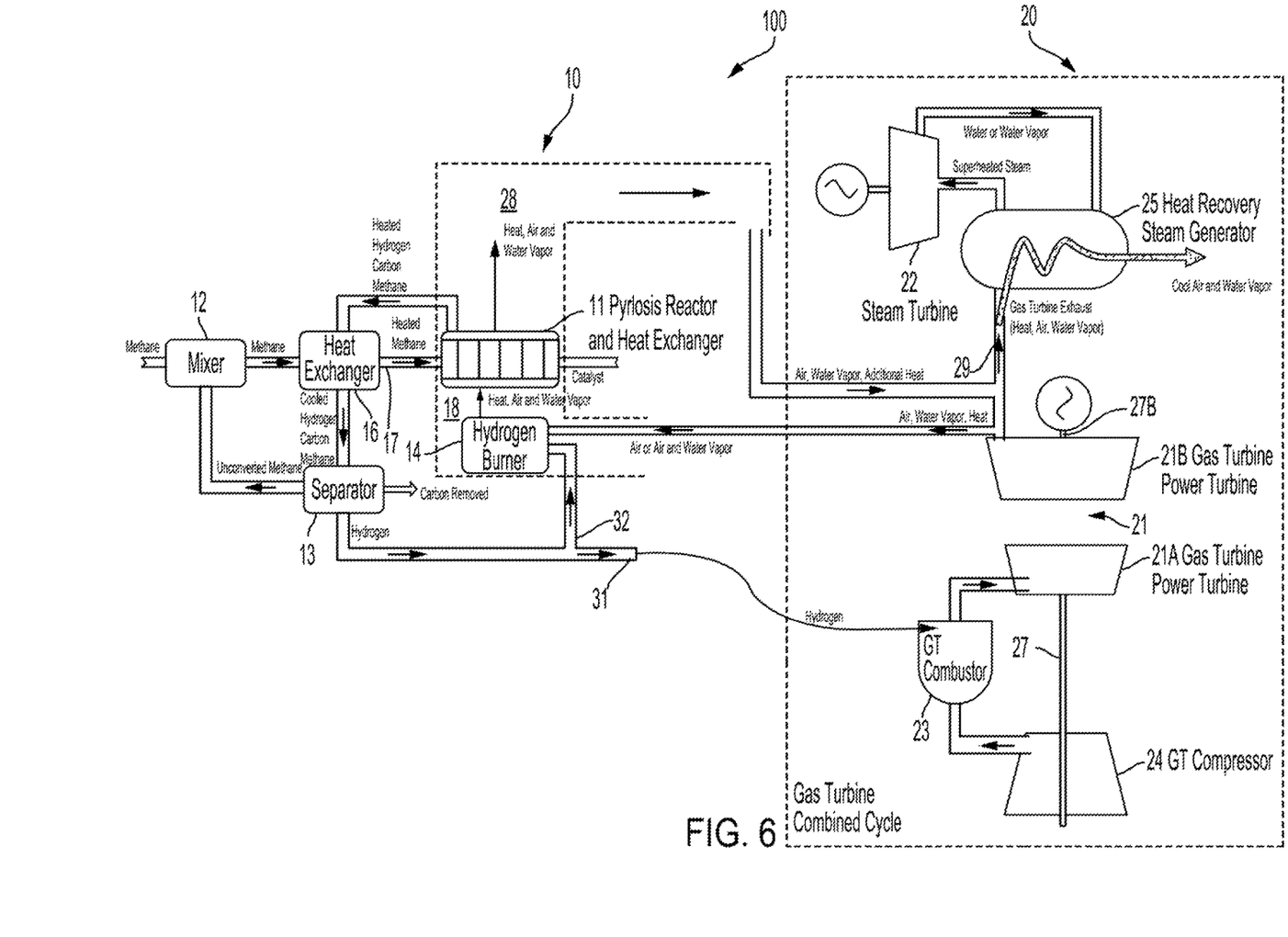
FIG. 6 is a configuration diagram of the system according to an embodiment of the present disclosure.

FIG. 6 is a configuration diagram of an embodiment of a system 100 for a baseline hydrogen production process.

The embodiment of FIG. 6 is similar to the embodiment of FIG. 2, except that the first turbine stage 21A and the second turbine stage 21B may not share a common rotational shaft 27. In this embodiment, the first turbine stage 21A and the compressor 24 may share a first common rotational shaft 27A so that the compressor 24 is configured to be driven by the first turbine stage 21A, and the second turbine stage 21B and the generator of the power generation system 20 may share a second common rotational shaft 27B so that the generator is configured to be driven by the second turbine stage 21B. Both the first turbine stage 21A and the second turbine stage 21B are configured to be driven by the combustion gas generated by the combustor 23.

FIG. 7 is a configuration diagram of an embodiment of a system 100 in which partially expanded gas turbine exit gas is directed at a predetermined temperature from the exit of a turbine stage 21A (also referred to as interstage extraction) to the catalytic pyrolysis reactor 11. The embodiment of FIG. 7 is similar to the embodiment of FIG. 3, except that the steam turbine 22 and the HRSG 25 are omitted. That is, the catalytic pyrolysis reactor 11, the air supply and the fuel supply may be integrated with the gas turbine 21 only. For example, the above-noted integrated approach could be implemented in a combined heat and power gas turbine system. In other words, the hydrogen gas production system 10 can also be integrated with gas turbine-only system. In these variations, the discharged gas supply line 29 may direct all non-fuel gases leaving the gas turbine 21 to an exhaust system and there may be no pressurized steam generation. Stated differently, the power generation system 20 may consist of the heated gas collection line 28 and the gas turbine 21.

FIG. 8 is a configuration diagram of an embodiment of a system 100 in which a portion of compressor exit air, which is partially heated due to the work of compression, is directed to the hydrogen burner 14 for the catalytic pyrolysis reactor 11. The embodiment of FIG. 8 is similar to the embodiment of FIG. 4, except that the steam turbine 22 and the HRSG 25 are omitted. Stated differently, the power generation system 20 may consist of the heated gas collection line 28 and the gas turbine 21.

FIG. 9 is a configuration diagram of an embodiment of a system 100 in which hydrogen is mixed with a portion of gas turbine exit gas flow and burned in the hydrogen burner 14 to provide heat for the catalytic pyrolysis reactor 11. The embodiment of FIG. 9 is similar to the embodiment of FIG. 5, except that the steam turbine 22 and the HRSG 25 are omitted. Stated differently, the power generation system 20 may consist of the heated gas collection line 28, the gas turbine 21 and the second heat exchanger 26.

The embodiments described above can be understood as follows, for example.

(1) A system 100 according to one aspect comprises: a hydrogen gas production system 10; and a power generation system 20, wherein the hydrogen gas production system 10 includes: a heated gas supply line 18 configured to allow a heated gas to flow therethrough;

a hydrocarbon supply line 17; a catalytic pyrolysis reactor 11 configured to: (i) produce a hydrogen containing gas by pyrolyzing a hydrocarbon introduced therein via the hydrocarbon supply line 17; and (ii) be in thermal contact with the heated gas of the heated gas supply line 18; and a separator 13 configured to extract a hydrogen gas from the hydrogen containing gas discharged from the catalytic pyrolysis reactor 11, and wherein the power generation system 20 includes: a heated gas collection line 28 configured to: (i) collect the heated gas after the thermal contact with the catalytic pyrolysis reactor 11; and (ii) supply the heated gas to the power generation system 20; and a gas turbine 21 having a combustor 23 configured to burn the hydrogen gas introduced therein from the separator 13 via a hydrogen supply line 31.

(2) The system 100 of the above (1), wherein the hydrogen gas production system 10 further includes a heat exchanger 16 configured to exchange a heat of the hydrocarbon of the hydrocarbon supply line 17 with a heat of the hydrogen containing gas discharged from the catalytic pyrolysis reactor 11 so as to heat the hydrocarbon before entering the catalytic pyrolysis reactor 11.

(3) The system 100 of the above (1), further comprising a pump 15 on the hydrogen supply line 31, the pump 15 being configured to increase a pressure of the hydrogen gas to above 250 psig.

(4) The system 100 of the above (1), wherein: the hydrogen supply line 31 is a first hydrogen supply line 31; and the hydrogen gas production system 10 further includes a hydrogen burner 14 configured to produce the heated gas of the heated gas supply line 18 by burning a part of the hydrogen gas supplied from the separator 13 via a second hydrogen supply line 32.

(5) The system 100 of the above (4), wherein: the power generation system 20 further includes a steam generator 25 configured to produce a steam using a heat of a discharged gas delivered from the gas turbine 21 through a discharged gas supply line 29; the hydrogen burner 14 is configured to burn the part of the hydrogen gas and a part of the discharged gas from the discharged gas supply line 29 so as to produce the heated gas; and the heated gas collection line 28 is configured to supply the heated gas after the thermal contact with the catalytic pyrolysis reactor 11 to the steam generator 25 or the discharged gas supply line 29.

(6) The system 100 of the above (1), wherein the heated gas collection line 28 is configured to: (i) collect the heated gas after passage through the catalytic pyrolysis reactor 11; and (ii) supply the heated gas to the gas turbine 21.

(7) The system 100 of the above (6), wherein: the gas turbine 21 has a turbine section configured to expand a combustion gas from the combustor 23, the turbine section having a plurality of turbine stages 21A, 21B; the heated gas supply line 18 is configured to allow a part of the combustion gas to flow therethrough which is extracted from a first of the plurality of turbine stages 21A, and the catalytic pyrolysis reactor 11 is configured to be in thermal contact with the part of the combustion gas in the heated gas supply line 18; and the heated gas collection line 28 is configured to: (i) collect the part of the combustion gas after the thermal contact with the catalytic pyrolysis reactor 11; and (ii) supply the part of the combustion gas to a second of the plurality of turbine stages 21B which is subsequently downstream of the first of the plurality of turbine stages 21A.

(8) The system 100 of the above (6), wherein: the hydrogen supply line 31 is a first hydrogen supply line 31; and the hydrogen gas production system 10 further includes a hydrogen burner 14 configured to produce the heated gas of the heated gas supply line 18 by burning a part of the hydrogen gas supplied from the separator 13 via a second hydrogen supply line 32.

(9) The system 100 of the above (8), wherein: the gas turbine 21 has a compressor section 24 configured to produce a compressed air for supply to the combustor 23; the hydrogen burner 14 is configured to burn the part of the hydrogen gas and a part of the compressed air so as to produce the heated gas; and the heated gas collection line 28 is configured to supply the heated gas after the thermal contact with the catalytic pyrolysis reactor 11 to the combustor 23.

(10) The system 100 of the above (8), further comprising: a heat exchanger 26, wherein: the power generation system 20 further includes a steam generator 25 configured to produce a steam using a heat of a discharged gas delivered from the gas turbine 21 through a discharged gas supply line 29; the hydrogen burner 14 is configured to burn the part of the hydrogen gas and a part of the discharged gas from the discharged gas supply line 29 so as to produce the heated gas; the heated gas collection line 28 is configured to supply the heated gas after the thermal contact with the catalytic pyrolysis reactor 11 to the steam generator 25 or the discharged gas supply line 29; the gas turbine 21 has a compressor section 24 configured to produce a compressed air supplied to the combustor 23; and the heat exchanger 26 is configured to exchange a heat of the compressed air supplied to the combustor 23 and a heat of the heated gas of the heated gas collection line 28.

(11) A method according to one aspect comprises: producing, by a catalytic pyrolysis reactor 11, a hydrogen containing gas by pyrolyzing a hydrocarbon introduced into the catalytic pyrolysis reactor 11 via a hydrocarbon supply line 17; and extracting, by a separator 13, a hydrogen gas from the hydrogen containing gas discharged from the catalytic pyrolysis reactor 11; collecting, by a heated gas collection line 28, a heated gas after thermal contact with the catalytic pyrolysis reactor 11; supplying, by the heated gas collection line 28, the heated gas to a power generation system 20; and burning, by a combustor 23 of a gas turbine 21, the hydrogen gas introduced therein from the separator 13 via a hydrogen supply line 31.

(12) The method of the above (11), further comprising exchanging, by a heat exchanger 16, a heat of the hydrogen containing gas discharged from the catalytic pyrolysis reactor 11 with the hydrocarbon of the hydrocarbon supply line 17 so as to heat the hydrocarbon before entering the catalytic pyrolysis reactor 11.

(13) The method of the above (11), further comprising increasing, by a pump 15 on the hydrogen supply line 31, a pressure of the hydrogen gas to above 250 psig.

(14) The method of the above (11), further comprising producing, by a hydrogen burner 14, the heated gas of the heated gas supply line 18 by burning a part of the hydrogen gas supplied from the separator 13 via another hydrogen supply line 32.

(15) The method of the above (14), further comprising: producing, by a steam generator 25, a steam using a heat of a discharged gas delivered from the gas turbine 21 through a discharged gas supply line 29; burning, by the hydrogen burner 14, the part of the hydrogen gas and a part of the discharged gas from the discharged gas supply line 29 so as to produce the heated gas; and supplying, by the heated gas collection line 28, the heated gas after the thermal contact with the catalytic pyrolysis reactor 11 to the steam generator 25 or the discharged gas supply line 29.

(16) The method of the above (11), further comprising: collecting, by the heated gas collection line 28, the heated gas after passage through the catalytic pyrolysis reactor 11; and supplying, by the heated gas collection line 28, the heated gas to the gas turbine 21.

(17) The method of the above (16), further comprising: expanding, by a turbine section of the gas turbine 21, a combustion gas from the combustor 23; allowing, by the heated gas supply line 18, a part of the combustion gas to flow therethrough which is extracted from a first of a plurality of turbine stages 21A of the turbine section, the catalytic pyrolysis reactor 11 being in thermal contact with the part of the combustion gas in the heated gas supply line 18; and collecting, by the heated gas collection line 28, the part of the combustion gas after the thermal contact with the catalytic pyrolysis reactor 11; and supplying, by the heated gas collection line 28, the part of the combustion gas to a second of the plurality of turbine stages 21B of the turbine section which is subsequently downstream of the first of the plurality of turbine stages 21A of the turbine section.

(18) The method of the above (16), further comprising producing, by a hydrogen burner 14, the heated gas of the heated gas supply line 18 by burning a part of the hydrogen gas supplied from the separator 13 via another hydrogen supply line 32.

(19) The method of the above (18), further comprising: producing, by a compressor section 24 of the gas turbine 21, a compressed air for supply to the combustor 23; burning, by the hydrogen burner 14, the part of the hydrogen gas and a part of the compressed air so as to produce the heated gas; and supplying, by the heated gas collection line 28, the heated gas after the thermal contact with the catalytic pyrolysis reactor 11 to the combustor 23.

(20) The method of the above (18), further comprising: producing, by a steam generator 25, a steam using a heat of a discharged gas delivered from the gas turbine 21 through a discharged gas supply line 29; burning, by the hydrogen burner 14, the part of the hydrogen gas and a part of the discharged gas from the discharged gas supply line 29 so as to produce the heated gas; supplying, by the heated gas collection line 28, the heated gas after the thermal contact with the catalytic pyrolysis reactor 11 to the steam generator 25 or the discharged gas supply line 29; producing, by a compressor section 24 of the gas turbine 21, a compressed air supplied to the combustor 23; and exchanging, by a heat exchanger 26, a heat of the compressed air supplied to the combustor 23 and a heat of the heated gas of the heated gas collection line 28.

(21) The system of the above (8), further comprising: a heat exchanger 26, wherein: the hydrogen burner 14 is configured to burn the part of the hydrogen gas and a first part of a discharged gas delivered from the gas turbine 21 so as to produce the heated gas; the heated gas collection line 28 is configured to supply the heated gas after the thermal contact with the catalytic pyrolysis reactor 11 to a discharged gas supply line 29 for exhausting a second part of the discharged gas delivered from the gas turbine 21; the gas turbine 21 has a compressor section 24 configured to produce a compressed air supplied to the combustor 23; and the heat exchanger 26 is configured to exchange a heat of the compressed air supplied to the combustor 23 and a heat of the heated gas of the heated gas collection line 28.

(22) The method of the above (18), further comprising: burning, by the hydrogen burner 14, the part of the hydrogen gas and a first part of a discharged gas delivered from the gas turbine 21 so as to produce the heated gas; supplying, by the heated gas collection line 28, the heated gas after the thermal contact with the catalytic pyrolysis reactor 11 to a discharged gas supply line 29 for exhausting a second part of the discharged gas delivered from the gas turbine 21; producing, by a compressor section 24 of the gas turbine 21, a compressed air supplied to the combustor 23; and exchanging, by a heat exchanger 26, a heat of the compressed air supplied to the combustor 23 and a heat of the heated gas of the heated gas collection line 28.

The system 100 may include a controller therein or a controller outside the system 100 for controlling various functions of various elements of the system 100.

The present disclosure may be implemented as any combination of an apparatus, a system, an integrated circuit, and a computer program on a non-transitory computer-readable recording medium. The one or more processors may be implemented as an integrated circuit (IC), an application specific integrated circuit (ASIC), or large scale integrated circuit (LSI), system LSI, super LSI, or ultra LSI components that perform a part or all of the functions described in the present disclosure.

The present disclosure includes the use of software, applications, computer programs, or algorithms. The software, applications, computer programs, or algorithms can be stored on a non-transitory computer-readable medium for causing a computer, such as the one or more processors, to execute steps described herein. For example, the one or more memories store software or algorithms with executable instructions and the one or more processors can execute a set of instructions of the software or algorithms in association with hydrogen production.

The software and computer programs, which can also be referred to as programs, software applications, applications, components, or code, include machine instructions for a programmable processor, and can be implemented in a high-level procedural language, an object-oriented programming language, a functional programming language, a logical programming language, or an assembly language or machine language. The term computer-readable medium refers to any computer program product, apparatus or device, such as a magnetic disk, optical disk, solid-state storage device, memory, and programmable logic devices (PLDs), used to provide machine instructions or data to a programmable data processor, including a computer-readable medium that receives machine instructions as a computer-readable signal.

By way of example, a computer-readable medium can comprise DRAM, RAM, ROM, EEPROM, CD-ROM or other optical disk storage, magnetic disk storage or other magnetic storage devices, or any other medium that can be used to carry or store desired computer-readable program code in the form of instructions or data structures and that can be accessed by a general-purpose or special-purpose computer, or a general-purpose or special-purpose processor. Disk or disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

Use of the phrases "capable of," "capable to," "operable to," or "configured to" in one or more embodiments, refers to some apparatus, logic, hardware, and/or element designed in such a way to enable use of the apparatus, logic, hardware, and/or element in a specified manner. The subject matter of the present disclosure is provided as examples of apparatus, systems, methods, and programs for performing the features described in the present disclosure. However, further features or variations are contemplated in addition to the features described above. It is contemplated that the implementation of the components and functions of the present disclosure can be done with any newly arising technology that may replace any of the above implemented technologies.

Additionally, the above description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, features described with respect to certain embodiments may be combined in other embodiments.

In summary, according to a system and a method of the present disclosure, it is possible to integrate hydrogen production with a gas turbine (for example, in a combined cycle power plant) to recover waste heat with zero $CO_2$ emissions. The waste heat is sent to a gas turbine system to improve the overall efficiency of power generation and hydrogen production.

REFERENCE CHARACTER LIST

10 Hydrogen Gas Production System
11 Catalytic Pyrolysis Reactor
12 Mixer
13 Separator
14 Burner
15 Pump
16 First Heat Exchanger
17 Hydrocarbon Supply Line
18 Heated Gas Supply Line
20 Power Generation System
21 Gas Turbine
21A First Turbine Stage
21B Second Turbine Stage
22 Steam Turbine
23 Combustor
24 Compressor
25 HRSG
26 Second Heat Exchanger
27 Rotational Shaft
27A First Rotational Shaft
27B Second Rotational Shaft
28 Heated Gas Collection Line
29 Discharged Gas Supply Line
30 Methane Supply
31 First Hydrogen Supply Line
32 Second Hydrogen Supply Line
100 (Overall) System

The invention claimed is:

1. A system comprising:
    a hydrogen gas production system; and
    a power generation system,
    wherein the hydrogen gas production system includes:
        a heated gas supply line configured to allow a heated gas to flow therethrough;
        a hydrocarbon supply line;
        a catalytic pyrolysis reactor configured to: (i) produce a hydrogen containing gas by pyrolyzing a hydrocarbon introduced therein via the hydrocarbon supply line; and (ii) be in thermal contact with the heated gas of the heated gas supply line;
        a separator configured to extract a hydrogen gas from the hydrogen containing gas discharged from the catalytic pyrolysis reactor; and
        a heat exchanger configured to exchange a heat of the hydrocarbon of the hydrocarbon supply line with a heat of the hydrogen containing gas discharged from the catalytic pyrolysis reactor so as to heat the hydrocarbon before entering the catalytic pyrolysis reactor, and
    wherein the power generation system includes:
        a heated gas collection line configured to: (i) collect the heated gas after the thermal contact with the catalytic pyrolysis reactor; and (ii) supply the heated gas to the power generation system; and
        a gas turbine having a combustor configured to burn the hydrogen gas introduced therein from the separator via a hydrogen supply line.

2. The system of claim 1, further comprising a pump on the hydrogen supply line, the pump being configured to increase a pressure of the hydrogen gas to above 250 psig.

3. The system of claim 1, wherein:
    the hydrogen supply line is a first hydrogen supply line; and
    the hydrogen gas production system further includes a hydrogen burner configured to produce the heated gas of the heated gas supply line by burning a part of the hydrogen gas supplied from the separator via a second hydrogen supply line.

4. The system of claim 3, wherein:
    the power generation system further includes a steam generator configured to produce a steam using a heat of a discharged gas delivered from the gas turbine through a discharged gas supply line;
    the hydrogen burner is configured to burn the part of the hydrogen gas and a part of the discharged gas from the discharged gas supply line so as to produce the heated gas; and
    the heated gas collection line is configured to supply the heated gas after the thermal contact with the catalytic pyrolysis reactor to the steam generator or the discharged gas supply line.

5. The system of claim 1, wherein the heated gas collection line is configured to: (i) collect the heated gas after passage through the catalytic pyrolysis reactor; and (ii) supply the heated gas to the gas turbine.

6. The system of claim 5, wherein:
    the hydrogen supply line is a first hydrogen supply line; and
    the hydrogen gas production system further includes a hydrogen burner configured to produce the heated gas of the heated gas supply line by burning a part of the hydrogen gas supplied from the separator via a second hydrogen supply line.

7. The system of claim 6, wherein:
    the gas turbine has a compressor section configured to produce a compressed air for supply to the combustor;

the hydrogen burner is configured to burn the part of the hydrogen gas and a part of the compressed air so as to produce the heated gas; and the heated gas collection line is configured to supply the heated gas after the thermal contact with the catalytic pyrolysis reactor to the combustor.

8. A system comprising:
a hydrogen gas production system; and
a power generation system,
wherein the hydrogen gas production system includes:
a heated gas supply line;
a hydrocarbon supply line;
a catalytic pyrolysis reactor configured to produce a hydrogen containing gas by pyrolyzing a hydrocarbon introduced therein via the hydrocarbon supply line; and
a separator configured to extract a hydrogen gas from the hydrogen containing gas discharged from the catalytic pyrolysis reactor,
wherein the power generation system includes:
a heated gas collection line; and
a gas turbine having a combustor configured to burn the hydrogen gas introduced therein from the separator via a hydrogen supply line, and
wherein:
the gas turbine has a turbine section configured to expand a combustion gas from the combustor, the turbine section having a plurality of turbine stages;
the heated gas supply line is configured to allow a part of the combustion gas to flow therethrough which is extracted from a first of the plurality of turbine stages, and the catalytic pyrolysis reactor is configured to be in thermal contact with the part of the combustion gas in the heated gas supply line; and
the heated gas collection line is configured to: (i) collect the part of the combustion gas after the thermal contact with the catalytic pyrolysis reactor; and (ii) supply the part of the combustion gas to a second of the plurality of turbine stages which is subsequently downstream of the first of the plurality of turbine stages.

9. A system comprising:
a hydrogen gas production system; and
a power generation system,
wherein the hydrogen gas production system includes:
a heated gas supply line configured to allow a heated gas to flow therethrough;
a hydrocarbon supply line;
a catalytic pyrolysis reactor configured to: (i) produce a hydrogen containing gas by pyrolyzing a hydrocarbon introduced therein via the hydrocarbon supply line; and (ii) be in thermal contact with the heated gas of the heated gas supply line;
a separator configured to extract a hydrogen gas from the hydrogen containing gas discharged from the catalytic pyrolysis reactor;
a heat exchanger; and
a hydrogen burner,
wherein the power generation system includes:
a heated gas collection line;
a gas turbine having: (i) a combustor configured to burn the hydrogen gas introduced therein from the separator via a first hydrogen supply line; and (ii) a compressor section configured to produce a compressed air supplied to the combustor; and
a steam generator, and wherein:
the steam generator is configured to produce a steam using a heat of a discharged gas delivered from the gas turbine through a discharged gas supply line;
the hydrogen burner is configured to produce the heated gas of the heated gas supply line by burning: (i) a part of the hydrogen gas supplied from the separator via a second hydrogen supply line; and (ii) a part of the discharged gas from the discharged gas supply line;
the heated gas collection line is configured to supply the heated gas after the thermal contact with the catalytic pyrolysis reactor to the steam generator or the discharged gas supply line; and
the heat exchanger is configured to exchange a heat of the compressed air supplied to the combustor and a heat of the heated gas of the heated gas collection line.

10. A method comprising:
producing, by a catalytic pyrolysis reactor, a hydrogen containing gas by pyrolyzing a hydrocarbon introduced into the catalytic pyrolysis reactor via a hydrocarbon supply line;
extracting, by a separator, a hydrogen gas from the hydrogen containing gas discharged from the catalytic pyrolysis reactor;
collecting, by a heated gas collection line, a heated gas after thermal contact with the catalytic pyrolysis reactor;
supplying, by the heated gas collection line, the heated gas to a power generation system;
burning, by a combustor of a gas turbine, the hydrogen gas introduced therein from the separator via a hydrogen supply line; and
exchanging, by a heat exchanger, a heat of the hydrogen containing gas discharged from the catalytic pyrolysis reactor with the hydrocarbon of the hydrocarbon supply line so as to heat the hydrocarbon before entering the catalytic pyrolysis reactor.

11. The method of claim 10, further comprising increasing, by a pump on the hydrogen supply line, a pressure of the hydrogen gas to above 250 psig.

12. The method of claim 10, further comprising producing, by a hydrogen burner, the heated gas of the heated gas supply line by burning a part of the hydrogen gas supplied from the separator via another hydrogen supply line.

13. The method of claim 12, further comprising:
producing, by a steam generator, a steam using a heat of a discharged gas delivered from the gas turbine through a discharged gas supply line;
burning, by the hydrogen burner, the part of the hydrogen gas and a part of the discharged gas from the discharged gas supply line so as to produce the heated gas; and
supplying, by the heated gas collection line, the heated gas after the thermal contact with the catalytic pyrolysis reactor to the steam generator or the discharged gas supply line.

14. The method of claim 10, further comprising:
collecting, by the heated gas collection line, the heated gas after passage through the catalytic pyrolysis reactor; and
supplying, by the heated gas collection line, the heated gas to the gas turbine.

15. The method of claim 14, further comprising producing, by a hydrogen burner, the heated gas of the heated gas supply line by burning a part of the hydrogen gas supplied from the separator via another hydrogen supply line.

16. The method of claim 15, further comprising:
producing, by a compressor section of the gas turbine, a compressed air for supply to the combustor;

burning, by the hydrogen burner, the part of the hydrogen gas and a part of the compressed air so as to produce the heated gas; and supplying, by the heated gas collection line, the heated gas after the thermal contact with the catalytic pyrolysis reactor to the combustor.

17. A method comprising:

producing, by a catalytic pyrolysis reactor, a hydrogen containing gas by pyrolyzing a hydrocarbon introduced into the catalytic pyrolysis reactor via a hydrocarbon supply line;

extracting, by a separator, a hydrogen gas from the hydrogen containing gas discharged from the catalytic pyrolysis reactor;

burning, by a combustor of a gas turbine, the hydrogen gas introduced therein from the separator via a hydrogen supply line;

expanding, by a turbine section of the gas turbine, a combustion gas from the combustor;

allowing, by a heated gas supply line, a part of the combustion gas to flow therethrough which is extracted from a first of a plurality of turbine stages of the turbine section, the catalytic pyrolysis reactor being in thermal contact with the part of the combustion gas in the heated gas supply line;

collecting, by a heated gas collection line, the part of the combustion gas after the thermal contact with the catalytic pyrolysis reactor; and supplying, by the heated gas collection line, the part of the combustion gas to a second of the plurality of turbine stages of the turbine section which is subsequently downstream of the first of the plurality of turbine stages of the turbine section.

18. A method comprising:

producing, by a catalytic pyrolysis reactor, a hydrogen containing gas by pyrolyzing a hydrocarbon introduced into the catalytic pyrolysis reactor via a hydrocarbon supply line;

extracting, by a separator, a hydrogen gas from the hydrogen containing gas discharged from the catalytic pyrolysis reactor;

burning, by a combustor of a gas turbine, the hydrogen gas introduced therein from the separator via a first hydrogen supply line;

producing, by a steam generator, a steam using a heat of a discharged gas delivered from the gas turbine through a discharged gas supply line;

producing, by a hydrogen burner, a heated gas of a heated gas supply line by burning: (i) a part of the hydrogen gas supplied from the separator via a second hydrogen supply line; and (ii) a part of the discharged gas from the discharged gas supply line;

supplying, by a heated gas collection line, the heated gas after thermal contact with the catalytic pyrolysis reactor to the steam generator or the discharged gas supply line;

producing, by a compressor section of the gas turbine, a compressed air supplied to the combustor; and exchanging, by a heat exchanger, a heat of the compressed air supplied to the combustor and a heat of the heated gas of the heated gas collection line.

19. A system comprising:

a hydrogen gas production system; and a power generation system, wherein the hydrogen gas production system includes:

a heated gas supply line configured to allow a heated gas to flow therethrough;

a hydrocarbon supply line;

a catalytic pyrolysis reactor configured to: (i) produce a hydrogen containing gas by pyrolyzing a hydrocarbon introduced therein via the hydrocarbon supply line; and (ii) be in thermal contact with the heated gas of the heated gas supply line;

a separator configured to extract a hydrogen gas from the hydrogen containing gas discharged from the catalytic pyrolysis reactor;

a heat exchanger; and a hydrogen burner, wherein the power generation system includes:

a heated gas collection line; and a gas turbine having: (i) a combustor configured to burn the hydrogen gas introduced therein from the separator via a first hydrogen supply line; and (ii) a compressor section configured to produce a compressed air supplied to the combustor, and wherein:

the hydrogen burner is configured to produce the heated gas by burning: (i) a part of the hydrogen gas supplied from the separator via a second hydrogen supply line; and (ii) a first part of a discharged gas delivered from the gas turbine;

the heated gas collection line is configured to supply the heated gas after the thermal contact with the catalytic pyrolysis reactor to a discharged gas supply line for exhausting a second part of the discharged gas delivered from the gas turbine; and the heat exchanger is configured to exchange a heat of the compressed air supplied to the combustor and a heat of the heated gas of the heated gas collection line.

20. A method comprising:

producing, by a catalytic pyrolysis reactor, a hydrogen containing gas by pyrolyzing a hydrocarbon introduced into the catalytic pyrolysis reactor via a hydrocarbon supply line;

extracting, by a separator, a hydrogen gas from the hydrogen containing gas discharged from the catalytic pyrolysis reactor;

burning, by a combustor of a gas turbine, the hydrogen gas introduced therein from the separator via a first hydrogen supply line;

producing, by a hydrogen burner, a heated gas of a heated gas supply line by burning a part of the hydrogen gas supplied from the separator via a second hydrogen supply line;

burning, by the hydrogen burner, the part of the hydrogen gas and a first part of a discharged gas delivered from the gas turbine so as to produce the heated gas;

supplying, by a heated gas collection line, the heated gas after thermal contact with the catalytic pyrolysis reactor to a discharged gas supply line for exhausting a second part of the discharged gas delivered from the gas turbine;

producing, by a compressor section of the gas turbine, a compressed air supplied to the combustor; and exchanging, by a heat exchanger, a heat of the compressed air supplied to the combustor and a heat of the heated gas of the heated gas collection line.

\* \* \* \* \*